(12) United States Patent
Suzuki (10) Patent No.: US 6,208,861 B1
(45) Date of Patent: Mar. 27, 2001

(54) MOBILE TERMINAL WITH GPS FUNCTION

(75) Inventor: Isao Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/721,209

(22) Filed: Sep. 26, 1996

(30) Foreign Application Priority Data

Sep. 29, 1995 (JP) .................................................. 7-253650

(51) Int. Cl.[7] .................................................. H04Q 7/20
(52) U.S. Cl. .................... 455/441; 455/456; 455/440; 455/428
(58) Field of Search .................... 455/428, 429, 455/430, 436, 440, 441, 456, 457, 13.2, 226.1

(56) References Cited

U.S. PATENT DOCUMENTS

| 4,903,212 | 2/1990 | Yokouchi et al. .................... 364/449 |
| 5,396,647 | * 3/1995 | Thompson et al. .................... 455/437 |
| 5,491,834 | * 2/1996 | Chia .................................... 455/441 |

FOREIGN PATENT DOCUMENTS

| 0453726 | 10/1991 | (EP) . |
| 0512789 | 11/1992 | (EP) . |
| 3104330 | 5/1991 | (JP) . |

OTHER PUBLICATIONS

WPI Abstract Accession No. 91–173933, corresponding to JPA 3–104330 (Sep. 9, 1989).

* cited by examiner

Primary Examiner—Thanh Cong Le
Assistant Examiner—Darnell R. Armstrong
(74) Attorney, Agent, or Firm—Sughrue, Mion, Zinn, Macpeak & Seas, PLLC (57) ABSTRACT

A mobile communication terminal is provided with a GPS receiver and detects a movement velocity of the mobile communication terminal based on GPS data. The period of time in which the channel condition of a radio channel is monitored is changed according to the movement velocity. The lower the movement velocity of the mobile communication terminal, the longer the period of time in which the radio channel is intermittently monitored. The radio channel is periodically monitored in a period of time changed according to the movement velocity of the mobile communication terminal. Channel switching is performed from a radio channel being used to a neighboring radio channel when the channel condition of the neighboring radio channel is better than that of the radio channel being used.

8 Claims, 6 Drawing Sheets

MOBILE TERMINAL WITH GPS FUNCTION

BACKGROUND OF THE INVENTION

1. Field of the Invention

The present invention generally relates to a cellular communication system, and in particular to a method for monitoring radio channels for channel switching in a mobile communication terminal such as a cellular telephone.

2. Description of the Related Art

In cellular communications, it is necessary to transfer a connection from one cell to another without interruption. For this end, a mobile terminal monitors radio channels of adjacent cells at all times so that, when the condition of a radio channel being used becomes worse and that of an adjacent radio channel becomes better, the mobile terminal changes the communication channel to the adjacent radio channel having a better radio condition.

Figure 1:
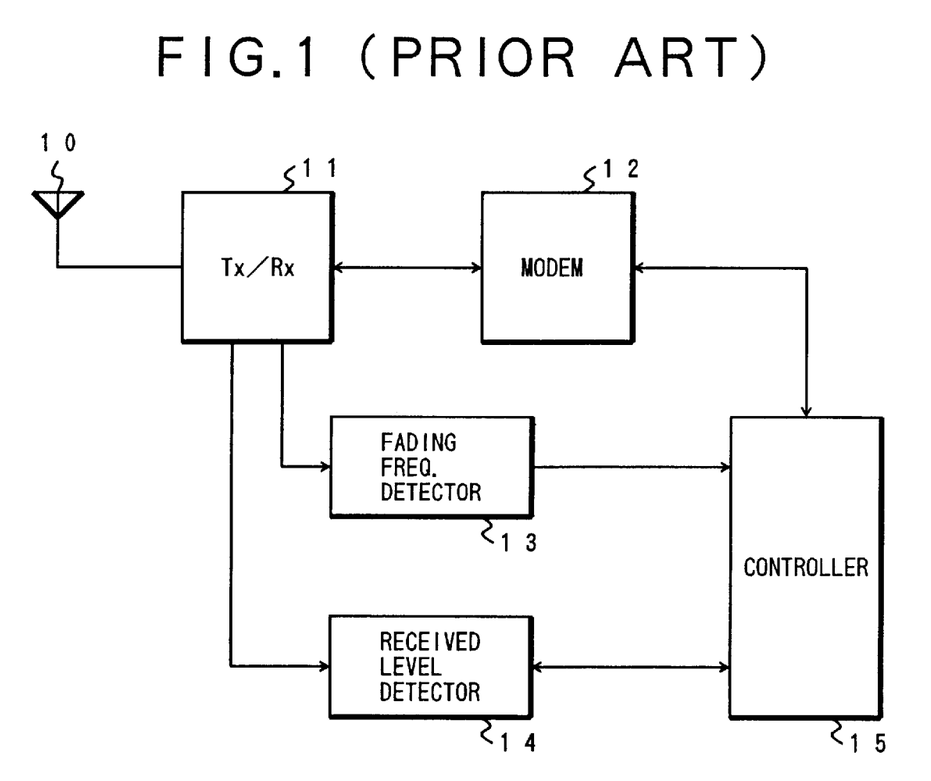
FIG. 1 is a block diagram showing a conventional mobile terminal.

One method of monitoring radio channels when the mobile terminal is moving has been disclosed in Japanese Patent Unexamined Publication No. 3-104330. In this method, the duration of measuring the strength level of a received signal is varied according to a velocity of the moving mobile terminal. As shown in FIG. 1, a mobile terminal has a transmission and reception system including an antenna 10, a radio transmitter-receiver 11, and a modulator-demodulator 12. The mobile terminal is further provided with a fading frequency detector 13, a received level detector 14, and a controller 15.

The fading frequency detector 13 detector facing frequency which is used to estimate a velocity of the mobile terminal by the controller 15. More specifically, the fading frequency detector 13, receiving an intermediate frequency signal from the radio transmitter-receiver 11, detects the envelope of a received signal strength. By comparing it with a predetermined household level, the fading frequency detector 13 counts the number of times the envelope has decreased below the predetermined threshold level for a predetermined time period to produce the fading frequency. When the fading frequency is low, it is estimated that the mobile terminal is moving at a relatively low velocity. Conversely, when the fading frequency is high, it is estimated that the mobile terminal is moving at a relatively high velocity.

Based on the estimated velocity, the duration of measuring the strength level of a received signal is changed. At a low velocity, the measuring duration is long enough to produce a significant averaged level of the strength level of the received signal. On the other hand, at a high velocity, the measuring duration is short so as to rapidly determine whether to transfer from one cell to another.

However, the velocity estimation method mentioned above cannot assure continued accuracy because the received signal strength varies due to not only the movement velocity of the mobile terminal but also multipath fading which is a characterization of radio propagation. More specifically, variations in received signal strength due to the multipath fading cause the fading frequency to change, resulting in reduced accuracy of the velocity estimation based on the fading frequency. This causes undesirable channel switching in a radio zone or a delay in transferring from a radio zone to another. In this manner, according to the conventional control method, it is difficult to transfer a connection with reliability. Further, since the measuring duration is relatively long at a low velocity, the power consumption is increased.

SUMMARY OF THE INVENTION

An object of the present invention is to provide a communication control method which can optimize channel monitoring so that switching to another radio channel with reliability regardless of the velocity of a mobile terminal can be achieved.

Another object of the present invention is to provide a mobile terminal which can switch channels reliably and save the battery power at any velocity of the mobile terminal.

Still another object of the present invention is to provide a cellular telephone with improved communication quality regardless of the movement velocity of the cellular telephone.

According to the present invention, a mobile communication terminal is provided with a GPS (Global Positioning System) receiver wherein a movement velocity of the mobile communication terminal is obtained based on GPS data received by the GPS receiver. An intermittent period of time during which the channel condition of a radio channel is monitored, is changed according to the movement velocity. Since the GPS data provides an accurate position of the mobile communication terminal, an accurate movement velocity of the mobile communication terminal is obtained regardless of cellular radio propagation characterization. The radio channel is periodically monitored wherein the frequency of monitoring is determined according to the accurate movement velocity of the mobile communication terminal. More specifically, the lower the movement velocity of the mobile communication terminal, then the less often the radio channel is monitored. That is, the lower the movement velocity, then the longer the intermittent period.

According to an aspect of the present invention, in a mobile terminal which is located in a communication area divided into a plurality of smaller radio zones, the GPS data are received from at least three GPS satellites and a movement velocity of the mobile terminal is detected based on the GPS data. An intermittent period is changed according to the movement velocity of the mobile terminal and the channel condition is monitored during the intermittent period with a constant monitoring time for each intermittent period. By comparing the channel condition of a first radio channel being used to that of a second radio channel, channel switching is performed from the first radio channel to the second radio channel when the channel condition of the second radio channel is better than that of the first radio channel.

Preferably, the intermittent period becomes longer as the movement velocity of the mobile terminal is reduced. Conversely, the intermittent period becomes shorter as the movement velocity of the mobile terminal is increased.

According to another aspect of the present invention, a mobile communication terminal periodically monitors channel conditions of a first radio channel of a first radio zone being used and a second radio channel of a second radio zone adjacent to the first radio zone. After detecting a movement velocity of the mobile communication terminal based on the GPS data as described above, the mobile communication terminal changes an intermittent period according to the movement velocity thereof and monitors the channel condition of the second radio channel during the intermittent period with a constant monitoring time for each intermittent period.

It is preferable that the channel condition of the second radio channel is not monitored when the movement velocity of the mobile communication terminal is zero.

Further, in addition to the intermittent period, it is preferable that a whole monitoring time period may be changed according to the movement velocity of the mobile communication terminal. The channel condition of the second radio channel is monitored during the intermittent period for the whole time period which has been changed according to the movement velocity of the mobile communication terminal.

DETAILED DESCRIPTION OF THE PREFERRED EMBODIMENTS

In cellular communication, the communication area is divided into smaller areas, called cells or radio zones, where a mobile terminal communicates with a nearby base station through a radio channel. The mobile terminal and/or the base station measures signal strength in both a radio channel being used and another radio channel of an adjacent cell and, when the condition of the adjacent channel is better than that of the radio channel being used, the connect is transferred from the radio channel in use to the adjacent radio channel. The details of a cellular telephone as an example of the mobile terminal will be described hereinafter.

Figure 2:
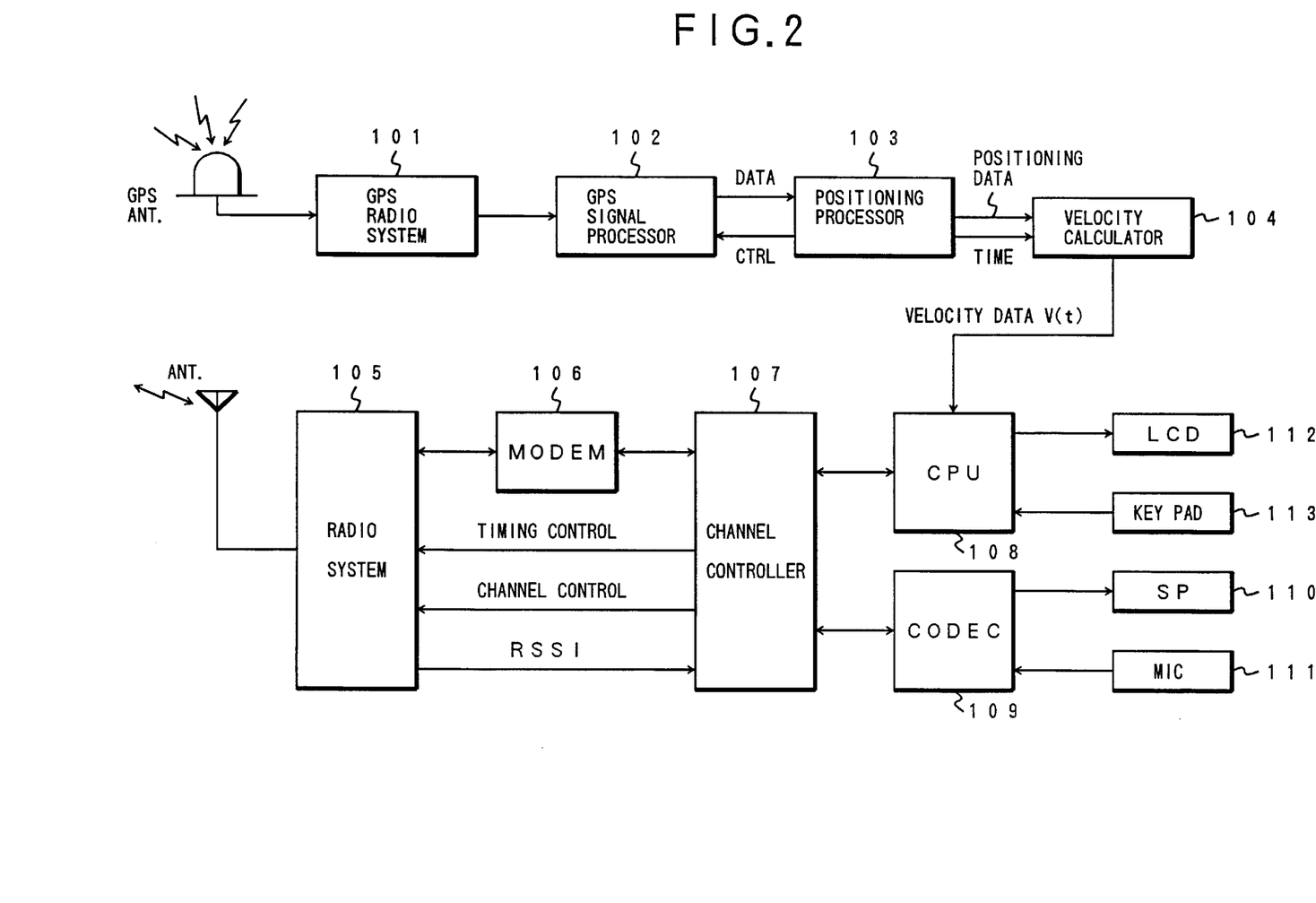
FIG. 2 is a block diagram showing a cellular telephone which is an embodiment of a mobile terminal according to the present invention.

Referring to FIG. 2, a battery-powered cellular telephone according to an embodiment of the present invention is provided with a GPS system. In the GPS system, a GPS radio system 101 receives GPS signals from GPS satellites through a GPS antenna and demodulates the GPS signals into GPS baseband signals. Receiving the GPS baseband is signals from the GPS radio system 101, a GPS signal processor 102 decodes these signals to retrieve useful data including satellite ID codes, orbit information of each satellite, atomic clock information, and delay correction data. A positioning processor 103 calculates the relative position of the cellular telephone based on GPS data of at least three GPS satellites using a well-known positioning procedure, and then outputs the positioning data to a velocity calculator 104. The velocity calculator 104 receives the positioning data at predetermined intervals and calculates a movement velocity of the cellular telephone using the positioning data and time information. The velocity data is used to control the period of time during which signal strength in radio channels is monitored as described later.

The cellular telephone is further comprised of a radio system 105, a modem (modulator and demodulator) 106, a channel controller 107, a processor 108, and other necessary elements including a codec (encoder and decoder) 109, a speaker 110, a microphone 111, a display 112, and a keypad 113. The radio system 105 includes a radio transmitter and a radio receiver to communicate with a nearby base station through a radio channel. A channel changing control and an intermittent receiving control are supplied by the channel controller 107 which is controlled by the processor 108. The electric field level of a radio channel is detected by the radio system 105 and is output to the channel controller 107 where the electric field level is used to determine whether to change to another radio channel within a radio zone or between adjacent radio zones. That is, the radio channel being used and adjacent radio channels are monitored while scanning.

The processor 108 stores a predetermined number of velocity levels which are compared to the calculated velocity received from the velocity calculator 104. According to a detected velocity level into which the calculated velocity falls, the processor 108 determines an intermittent period of time during which the electric field level of an adjacent radio channel is monitored. The channel controller 107 controls the radio system 105 such that radio signals in adjacent radio channels are intermittently received and their electric field levels are detected during the determined period of time.

In this embodiment, the processor 108 stores three velocity levels: high, middle, and low. The lower the velocity level, the less often the radio channels are monitored while the receiving duration for channel monitoring is kept constant. In cases where the calculated velocity is zero, that is, the cellular telephone stops at a location within a radio zone, it is preferable that the processor 108 stops the channel controller 107 from monitoring adjacent radio channels so as to save the battery power. These operations of the cellular telephone will be described in detail hereinafter.

Figure 3:
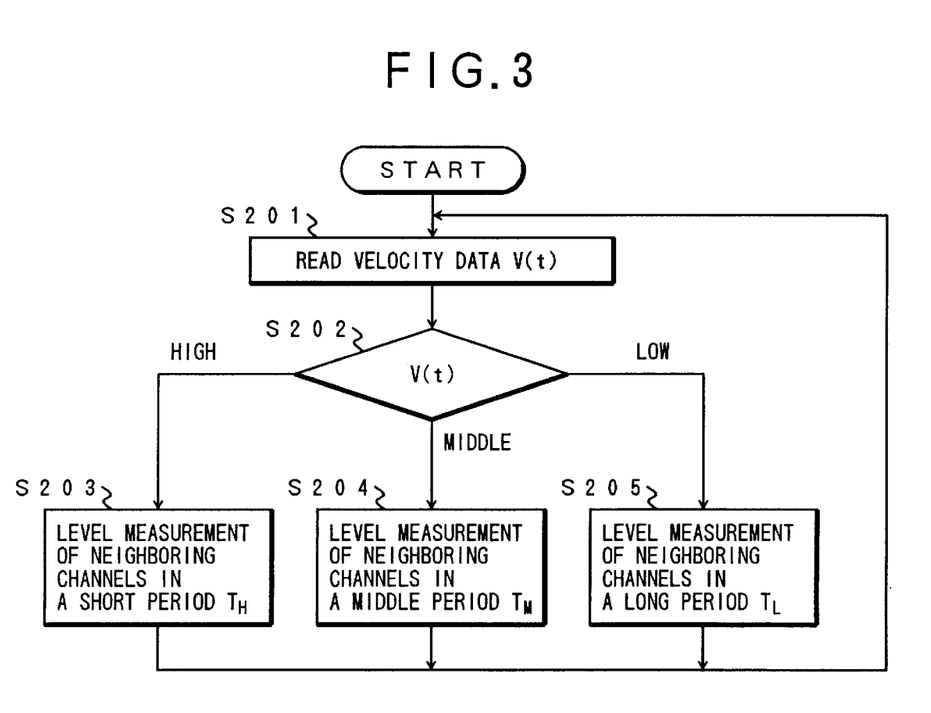
FIG. 3 is a flowchart showing a first embodiment of a channel monitoring method according to the present invention.

Referring to FIG. 3, when reading the calculated velocity data V(t) from the velocity calculator 104 (step S201), the processor 108 determines a velocity level of the received velocity data V(t) by comparing it to the stored velocity levels: high, middle, and low (step S202). When the calculated velocity data V(t) is in the high velocity level, the processor 108 sets the intermittent period to a predetermined short period $T_H$ (step S203). The channel controller 107 controls the radio system 105 such that radio signals in adjacent radio channels are intermittently received and their electric field levels are detected during the short period $T_H$. When the calculated velocity data V(t) is in the middle velocity level, the processor 108 sets the intermittent period to a predetermined middle period $T_M$ (step S204). The channel controller 107 controls the radio system 105 such that radio signals in adjacent radio channels are intermittently received and their electric field levels are detected during the middle period $T_M$. When the calculated velocity data V(t) is in the low velocity level, the processor 108 sets the intermittent period to a predetermined long period $T_L$ (step S205). The channel controller 107 controls the radio system 105 such that radio signals in adjacent radio channels are intermittently received and their electric field levels are detected during the long period $T_L$. In this manner, the intermittent period is varied according to a detected velocity level as shown in FIG. 4.

Figure 4:
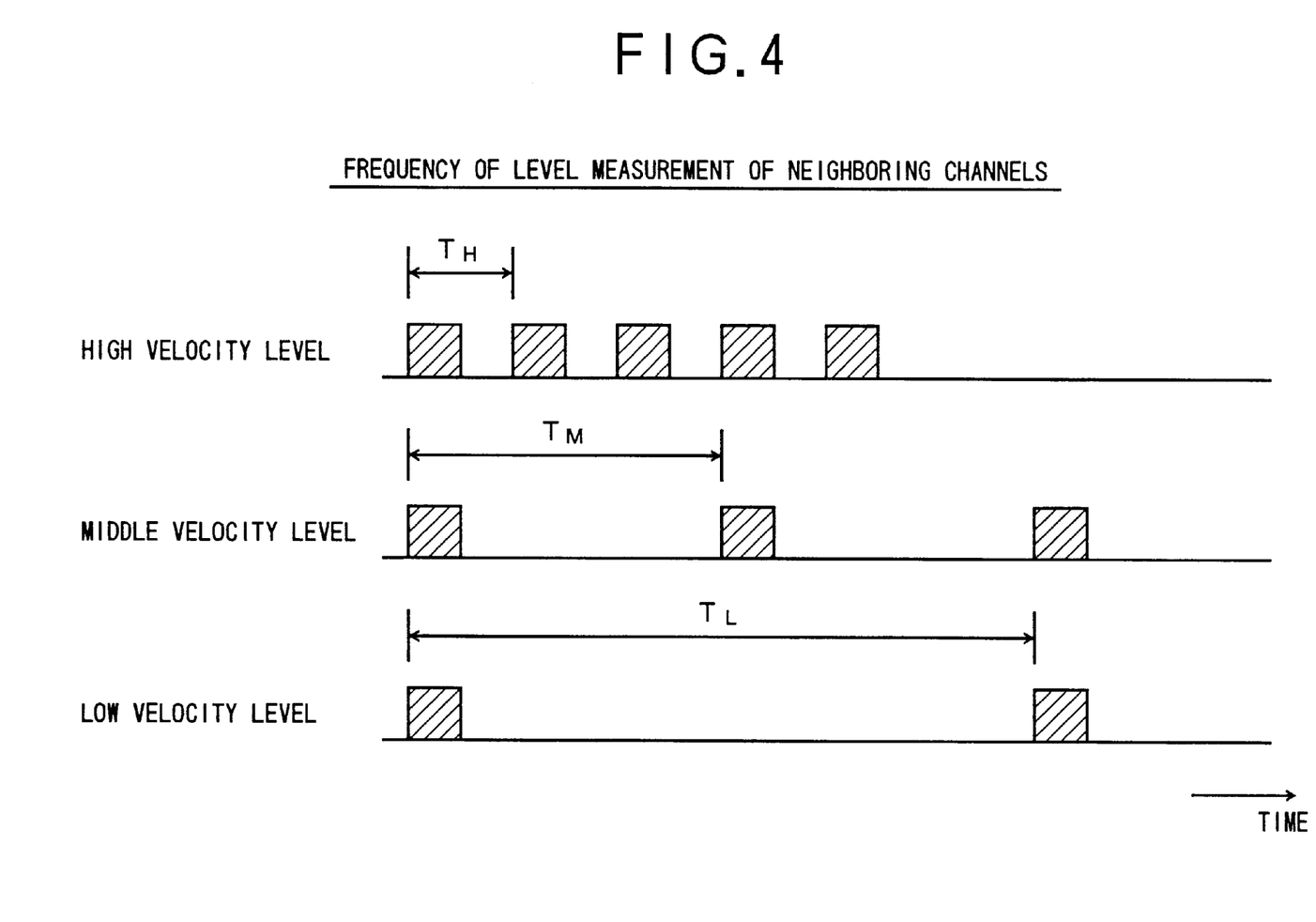
FIG. 4 is a time chart showing the level monitoring frequency in neighboring radio channels with respect to the movement velocity of the mobile terminal.

Referring to FIG. 4, the lower the velocity level, the longer the intermittent period. In other words, the lower the velocity level, the less often neighboring channels are monitored. In cases where the velocity level is low, the neighboring channels are monitored in intervals over a long period of time so as to avoid undesirable channel switch due to multipath fading and the likes. The duration time of level measurement is constant at any velocity level in this embodiment, which is determined to be long enough to average a fading signal having a relatively long period at the low velocity level.

it is further preferable that the whole period of measurement of electronic field strength level becomes shorter as the velocity level is increased. Such a method allows a fading signal having a relatively long period at the low velocity level to be sufficiently averaged, so that the undesirable channel switch is prevented when a received level change due to fading suddenly occurs, resulting in further increased reliability of channel switching.

Figure 5:
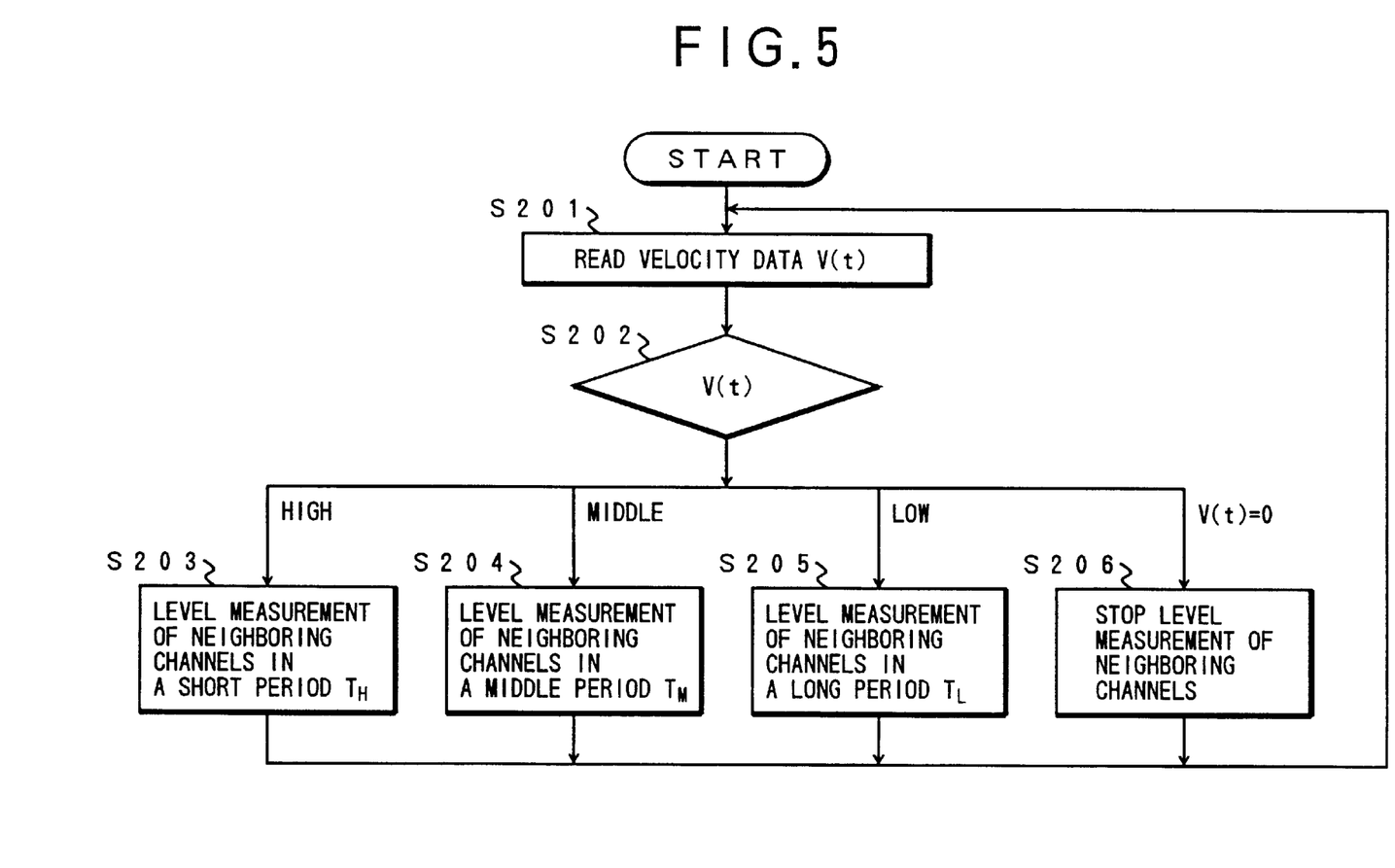
FIG. 5 is a flowchart showing a second embodiment of a channel monitoring method according to the present invention.

In cases where the cellular telephone stops at a location within a radio zone, the processor 108 may stop the channel controller 107 from monitoring adjacent radio channels so as to save the battery power. As shown in FIG. 5, where the steps S201–S205 are similar to those previously described with reference to FIG. 3, when the processor 108 reads the velocity data V(t)=0 from the velocity calculator 104 (S201, S202), the processor 108 stops the channel controller 107 from monitoring adjacent radio channels (S206).

Under the control of the processor 108, the channel controller 107 monitors the radio channel being used and further monitors adjacent radio channels during the period of time determined by the processor 108.

Figure 6:
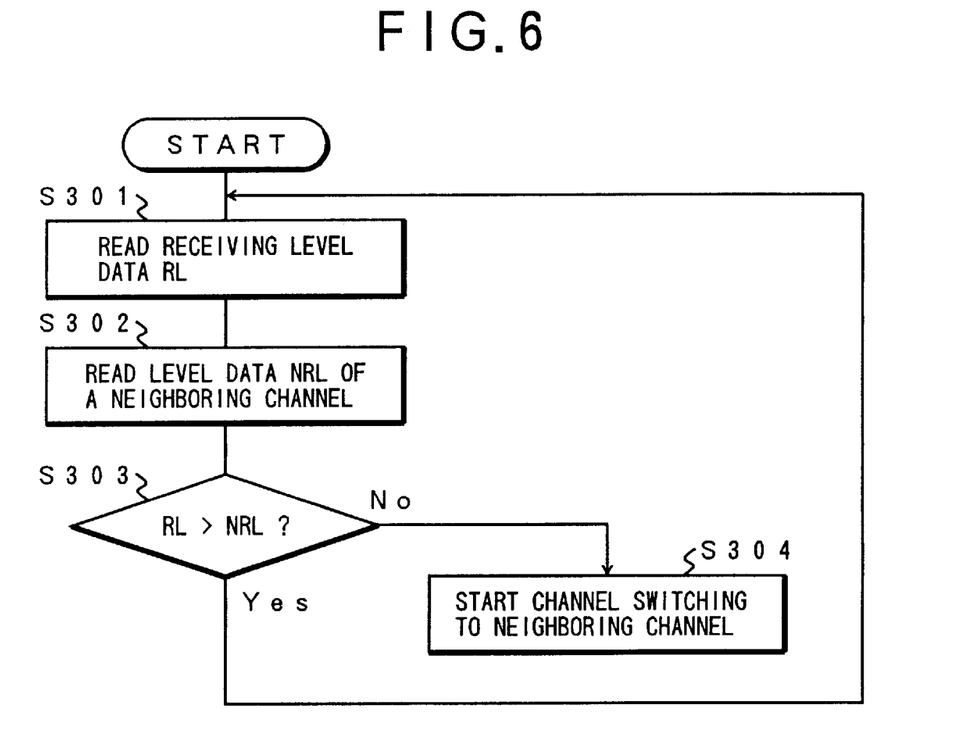
FIG. 6 is a flowchart showing a level comparison procedure according to the present invention.

Referring to FIG. 6, the channel controller 107 reads the electronic field level data RL of the radio channel being used from the radio system 105 (S301) and then further reads the electric field level data NRL of a neighboring radio channel from the radio system 105 (S302). When RL>NRL, that is, the radio channel being used is better than the neighboring channel (Yes in step S303), the radio channel being used is held and the control goes back to the step S301. When RL is not greater than NRL, that is, the radio channel being used is not better than the neighboring channel (No in step S303), the channel controller 107 starts a predetermined channel switching procedure of switching the radio channel being used to the neighboring channel (step S304).

In cases where the cellular telephone stops at a location within a radio zone, the processor 108 may stop the channel controller 107 monitoring adjacent radio channels. In this case, the channel controller 107 does not read the electric field level data NRL of a neighboring radio channel from the radio system 105.

What is claimed is:

1. A method for monitoring a channel condition of a radio channel in a mobile terminal which is located in a communication area divided into a plurality of smaller radio zones, comprising the steps of:
   a) receiving GPS (Global Positioning System) data from at least three GPS satellites;
   b) detecting a movement velocity of the mobile terminal based on the GPS data;
   c) changing an intermittent period according to the movement velocity of the mobile terminal; and
   d) monitoring the channel condition during the intermittent period with a duration interval for monitoring the channel condition for each intermittent period, wherein the intermittent period is measured from a beginning of the duration interval for monitoring a channel condition to a next beginning of the duration interval for monitoring a channel condition,
   wherein the step c) comprises changing a whole monitoring time period in addition to the intermittent time period according to the movement velocity of the mobile terminal; and
   the step d) comprises monitoring the channel condition during the intermittent period for the whole time period which have been changed according to the movement velocity of the mobile terminal.

2. The method according to claim 1, further comprising the step of:
   e) comparing the channel condition of a first radio channel to that of a second radio channel, the first radio channel being used; and
   f) switching from the first radio channel to the second radio channel when the channel condition of the second radio channel is better than that of the first radio channel.

3. The method according to claim 1, wherein, in the step c), the intermittent period becomes longer as the movement velocity of the mobile terminal is reduced.

4. The method according to claim 3, wherein the intermittent period becomes shorter as the movement velocity of the mobile terminal is increased.

5. In a mobile communication terminal which is located in a communication are divided into a plurality of smaller radio zones, a method for monitoring channel conditions of a first radio channel of a first radio zone being used and a second radio channel of a second radio zone adjacent to the first radio zone, the method comprising the steps of:
   (a) receiving GPS (Global Positioning System) data from at least three GPS satellites;
   (b) detecting a movement velocity of the mobile communication terminal based on the GPS data;
   (c) changing an intermittent period according to the movement velocity of the mobile communication terminal; and
   (d) monitoring the channel condition of the second radio channel during the intermittent period with a duration interval for monitoring the channel condition for each intermittent period, wherein the intermittent period is measured from a beginning of the duration interval for monitoring a channel condition to a next beginning of the duration interval for monitoring the channel condition,
   wherein the step c) comprises changing a whole monitoring time period in addition to the intermittent period according to the movement velocity of the mobile communication terminal; and
   the step d) comprises monitoring the channel condition of the second radio channel in the intermittent period for the whole time period which have been changed according to the movement velocity of the mobile communication terminal.

6. A method for monitoring a channel condition of a radio channel in a mobile terminal which is located in communication area divided into a plurality of smaller radio zones, comprising the steps of:
   (a) receiving GPS (Global Positioning System) data from at least three GPS satellites;
   (b) detecting a movement velocity of the mobile terminal based on the GPS data;
   (c) changing an intermittent period according to the movement velocity of the mobile terminal; and
   (d) monitoring the channel condition during the intermittent period with a constant duration interval for monitoring the channel for each intermittent period;
   wherein in said changing step, the intermittent period is changed by comparing the detected movement velocity to stored velocity level ranges, each range having an associated intermittent period, and according to the stored velocity level range in which the detected movement velocity falls, the associated intermittent period is set as the intermittent period.

7. A method for monitoring a channel condition of a radio channel in a mobile terminal which is located in communication area divided into a plurality of smaller radio zones, comprising the steps of:

(a) receiving GPS (Global Positioning System) data from at least three GPS satellites;

(b) detecting a movement velocity of the mobile terminal based on the GPS data;

(c) changing an intermittent period according to the movement velocity of the mobile terminal; and (d) monitoring the channel condition during the intermittent period with a constant duration interval for monitoring the channel for each intermittent period;

wherein the intermittent period is measured from a beginning of the constant duration interval for measuring a channel condition to a next beginning of the constant duration interval for monitoring a channel condition.

8. In a mobile communication terminal which is located in a communication area divided into a plurality of smaller radio zones, a method for monitoring channel conditions of a first radio channel of a first radio zone being used and a second radio channel of a second radio zone adjacent to the first radio zone, the method comprising the steps of:

(a) receiving GPS (Global Positioning System) data from at least three GPS satellites;

(b) detecting a movement velocity of the mobile terminal based on the GPS data;

(c) changing an intermittent period according to the movement velocity of the mobile terminal; and (d) monitoring the channel condition of the second radio channel during the intermittent period with a constant duration interval for monitoring the channel condition for each intermittent period, wherein the intermittent period is measured from a beginning of the constant duration interval for measuring a channel condition to a next beginning of the constant duration interval for monitoring a channel condition.

* * * * *